US009894612B1

(12) United States Patent
Yakobi

(10) Patent No.: US 9,894,612 B1
(45) Date of Patent: Feb. 13, 2018

(54) REDUCING POWER CONSUMPTION IN A REMOTE UNIT OF A WIRELESS DISTRIBUTION SYSTEM (WDS) FOR INTERMODULATION PRODUCT SUPPRESSION

(71) Applicant: Corning Optical Communications Wireless Ltd, Airport City (IL)

(72) Inventor: Motti Yakobi, Beer-Tuvia (IL)

(73) Assignee: Corning Optical Communications Wireless Ltd, Airport City (IL)

( * ) Notice: Subject to any disclaimer, the term of this patent is extended or adjusted under 35 U.S.C. 154(b) by 0 days.

(21) Appl. No.: 15/342,311

(22) Filed: Nov. 3, 2016

(51) Int. Cl.
*H04B 1/38* (2015.01)
*H04M 1/00* (2006.01)
*H04W 52/02* (2009.01)
*H04B 17/345* (2015.01)
*H04B 1/00* (2006.01)
*H04B 15/00* (2006.01)
*H04B 17/00* (2015.01)
*H04B 1/16* (2006.01)

(52) U.S. Cl.
CPC ...... *H04W 52/0238* (2013.01); *H04B 17/345* (2015.01); *H04B 1/16* (2013.01)

(58) Field of Classification Search
CPC .......................... H04W 52/0238; H04B 17/345
USPC ..................................... 455/63.1, 67.13, 574
See application file for complete search history.

(56) References Cited

U.S. PATENT DOCUMENTS

| 5,699,176 A | 12/1997 | Cohen |
|---|---|---|
| RE35,736 E | 2/1998 | Powell |
| 6,359,714 B1 | 3/2002 | Imajo |
| 6,751,447 B1 | 6/2004 | Jin et al. |
| 7,809,047 B2 | 10/2010 | Kummetz |
| 8,253,003 B2 | 8/2012 | Ruttenberg |
| 8,331,509 B2 | 12/2012 | Wang et al. |
| 9,106,453 B2 | 8/2015 | Wang et al. |
| 9,253,003 B1 | 2/2016 | Harel |
| 9,258,052 B2 | 2/2016 | George et al. |
| 2001/0040932 A1 | 11/2001 | Lindquist et al. |
| 2002/0072344 A1 | 6/2002 | Souissi |
| 2002/0193071 A1 | 12/2002 | Waltho |
| 2003/0161637 A1 | 8/2003 | Yamamoto et al. |
| 2003/0198475 A1 | 10/2003 | Tiemann et al. |
| 2004/0151238 A1 | 8/2004 | Masenten |

(Continued)

Primary Examiner — Ayodeji Ayotunde
(74) Attorney, Agent, or Firm — C. Keith Montgomery

(57) ABSTRACT

Embodiments of the disclosure relate to reducing power consumption in a remote unit of a wireless distribution system (WDS) for intermodulation product suppression. Intermodulation products generated by a power amplifier circuit can leak from a downlink signal path into an uplink signal path to degrade sensitivity of the uplink signal path in a remote unit. In this regard, the remote unit is configured to measure a power of the leaked intermodulation products and enables a selected number of power amplifiers in the power amplifier circuit for reducing the measured power of the leaked intermodulation products to a predetermined threshold. By enabling only the selected number of power amplifiers based on the measured power of the leaked intermodulation products, it is possible to avoid enabling an excessive number of power amplifiers in the power amplifier circuit, thus helping to reduce power consumption for intermodulation product suppression.

28 Claims, 9 Drawing Sheets

(56) References Cited

U.S. PATENT DOCUMENTS

| | | |
|---|---|---|
| 2004/0218562 A1 | 11/2004 | Orava et al. |
| 2005/0107051 A1 | 5/2005 | Aparin et al. |
| 2005/0244166 A1 | 11/2005 | Shinagawa et al. |
| 2007/0133995 A1 | 6/2007 | Lee et al. |
| 2007/0184790 A1* | 8/2007 | Gilberton .............. H03F 1/0205 455/127.1 |
| 2008/0039045 A1 | 2/2008 | Filipovic et al. |
| 2008/0089397 A1 | 4/2008 | Vetter et al. |
| 2009/0238573 A1 | 9/2009 | Bauman |
| 2010/0048146 A1 | 2/2010 | McCallister |
| 2010/0166109 A1 | 7/2010 | Neumann et al. |
| 2010/0197231 A1 | 8/2010 | Kenington |
| 2011/0158081 A1 | 6/2011 | Wang et al. |
| 2011/0228828 A1 | 9/2011 | Wang et al. |
| 2011/0234315 A1* | 9/2011 | Chen .................... H03F 1/3229 330/149 |
| 2012/0262234 A1 | 10/2012 | Lee et al. |
| 2012/0329523 A1 | 12/2012 | Stewart et al. |
| 2013/0210375 A1* | 8/2013 | Dufrene ................ H04B 1/525 455/79 |
| 2013/0295980 A1 | 11/2013 | Reuven et al. |
| 2014/0036770 A1 | 2/2014 | Stapleton et al. |
| 2014/0162712 A1 | 6/2014 | Feld et al. |
| 2014/0178064 A1 | 6/2014 | Hino |
| 2015/0195055 A1 | 7/2015 | Ben-Shlomo |
| 2015/0282105 A1 | 10/2015 | Harel |
| 2016/0127027 A1 | 5/2016 | Ling et al. |

\* cited by examiner

REDUCING POWER CONSUMPTION IN A REMOTE UNIT OF A WIRELESS DISTRIBUTION SYSTEM (WDS) FOR INTERMODULATION PRODUCT SUPPRESSION

BACKGROUND

The disclosure relates generally to suppressing intermodulation product(s) in a wireless distribution system (WDS), such as a distributed antenna system (DAS) and, more particularly, to reducing power consumption in remote units in the WDS.

Wireless customers are increasingly demanding digital data services, such as streaming video signals. At the same time, some wireless customers use their wireless communications devices in areas that are poorly serviced by conventional cellular networks, such as inside certain buildings or areas where there is little cellular coverage. One response to the intersection of these two concerns has been the use of DASs. DASs include remote units configured to receive and transmit communications signals to client devices within the antenna range of the remote units. DASs can be particularly useful when deployed inside buildings or other indoor environments where the wireless communications devices may not otherwise be able to effectively receive radio frequency (RF) signals from a source.

In this regard, FIG. 1 illustrates distribution of communications services to remote coverage areas 100(1)-100(N) of a wireless distribution system (WDS) provided in the form of a DAS 102, wherein 'N' is the number of remote coverage areas. These communications services can include cellular services, wireless services, such RF identification (RFID) tracking, Wireless Fidelity (Wi-Fi), local area network (LAN), and wireless LAN (WLAN), wireless solutions (Bluetooth, Wi-Fi Global Positioning System (GPS) signal-based, and others) for location-based services, and combinations thereof, as examples. The remote coverage areas 100(1)-100(N) may be remotely located. In this regard, the remote coverage areas 100(1)-100(N) are created by and centered on remote units 104(1)-104(N) connected to a head-end equipment (HEE) 106 (e.g., a head-end controller, a head-end unit, or a central unit). The HEE 106 may be communicatively coupled to a signal source 108, for example, a base transceiver station (BTS) or a baseband unit (BBU). In this regard, the HEE 106 receives downlink communications signals 110D from the signal source 108 to be distributed to the remote units 104(1)-104(N). The remote units 104(1)-104(N) are configured to receive the downlink communications signals 110D from the HEE 106 over a communications medium 112 to be distributed to the respective remote coverage areas 100(1)-100(N) of the remote units 104(1)-104(N). In a non-limiting example, the communications medium 112 may be a wired communications medium, a wireless communications medium, or an optical fiber-based communications medium. Each of the remote units 104(1)-104(N) may include an RF transmitter/receiver and a respective antenna 114(1)-114(N) operably connected to the RF transmitter/receiver to wirelessly distribute the communications services to client devices 116 within the respective remote coverage areas 100(1)-100(N). The remote units 104(1)-104(N) are also configured to receive uplink communications signals 110U from the client devices 116 in the respective remote coverage areas 100(1)-100(N) to be distributed to the signal source 108. The size of each of the remote coverage areas 100(1)-100(N) is determined by the amount of RF power transmitted by the respective remote units 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the remote units 104(1)-104(N) mainly determine the size of the respective remote coverage areas 100(1)-100(N).

With reference to FIG. 1, each of the remote units 104(1)-104(N) may be configured to support more than one type of wireless service that operates in a variety of RF spectrums and bandwidths. The downlink communications signals 110D received by the remote units 104(1)-104(N) are typically amplified by a power amplifier to increase signal strength before distributing the downlink communications signals 110D to the client devices 116 through the respective antenna 114(1)-114(N). However, non-linearity of the power amplifier can cause an intermodulation product(s) (e.g., a third-order intermodulation product (IM3), a fifth-order intermodulation product (IM5), etc.) to be generated when the power amplifier amplifies the downlink communications signals 110D. For instance, when the downlink communications signals 110D operating in a 850-870 megahertz (MHz) downlink spectrum are amplified by the power amplifier, intermodulation product(s) may be generated below 850 MHz (e.g., 830 MHz, 810 MHz, 790 MHz, and so on) and above 870 MHz (e.g. 890 MHz, 910 MHz, 930 MHz, and so on). The intermodulation product(s) may leak from a downlink signal path 118D into an uplink signal path 118U in the remote units 104(1)-104(N) if the downlink signal path is insufficiently isolated from the uplink signal path. As a result, the leaked intermodulation product(s) may interfere with the uplink communications signals 110D that are received in an adjacent uplink spectrum. For example, if a remote unit 104(1)-104(N) receives the uplink communications signals 110U in an 825-845 MHz uplink spectrum, the intermodulation product generated at 830 MHz would fall into the 825-845 MHz uplink spectrum, thus interfering with the uplink communications signal 110U. As such, it may be desirable to suppress the intermodulation product(s), which may be leaked from the downlink signal path into the uplink signal path, to reduce RF interference and improve RF performance in the remote units 104(1)-104(N).

No admission is made that any reference cited herein constitutes prior art. Applicant expressly reserves the right to challenge the accuracy and pertinency of any cited documents.

SUMMARY

Embodiments of the disclosure relate to reducing power consumption in a remote unit of a wireless distribution system (WDS) for intermodulation product suppression. In exemplary aspects disclosed herein, one or more remote units in a WDS are configured to receive a downlink radio frequency (RF) signal in a downlink signal path. The remote units amplify the downlink RF signal using a power amplifier circuit before communicating to client devices. Because intermodulation products of the downlink RF signal generated as a result of the non-linearity of the power amplifier circuit may leak from the downlink signal path into an uplink signal path, thus degrading sensitivity of the uplink signal path, the remote units are configured to reduce the power of these leaked intermodulation products. In this regard, remote units in the WDS include a power amplifier circuit that includes a plurality of power amplifiers each configured to receive and amplify downlink RF signals in the downlink signal path. To reduce power of these leaked intermodulation products, the remote units are configured to measure the power of these leaked intermodulation products in the uplink signal path. The remote units are configured to enable a selected number of power amplifiers among the plurality of power amplifiers to amplify the downlink RF signals based on the measured power of the leaked intermodulation products. The selected number of power amplifiers is determined to amplify the downlink RF signal to a desired power for communicating to the client devices, while reducing the power of the leaked intermodulation products to be below a predetermined threshold. In a non-limiting example, the selected number of power amplifiers is a minimum number of power amplifiers among the plurality of power amplifiers required to amplify the downlink RF signal to the desired power for communicating to the client devices, while reducing the power of the leaked intermodulation products to be below the predetermined threshold. Given that the plurality of power amplifiers each consume a certain amount of power, enabling the selected number of power amplifiers can lead to reduced power consumption at the remote units. Hence, by enabling only the selected number of power amplifiers in the power amplifier circuit based on the measured power of the leaked intermodulation products in the uplink signal path, it is possible to avoid enabling an excessive number of power amplifiers, thus assisting in reducing power consumption for intermodulation product suppression.

In this regard, in one aspect, a remote unit in a WDS is provided. The remote unit comprises a power amplifier circuit in a downlink signal path comprising a plurality of power amplifiers. The power amplifier circuit is configured to receive a downlink RF signal in the downlink signal path of the remote unit. The downlink RF signal comprises at least one first downlink RF signal and at least one second downlink RF signal. The power amplifier circuit is also configured to amplify the downlink RF signal to generate an amplified downlink RF signal comprising at least one amplified first downlink RF signal, at least one amplified second downlink RF signal, and at least one intermodulation product caused by power amplification of the at least one first downlink RF signal and the at least one second downlink RF signal. The remote unit also comprises a measurement circuit coupled to an uplink signal path of the remote unit. The measurement circuit is configured to measure a power of a leaked intermodulation product caused by the at least one intermodulation product leaked from the downlink signal path into the uplink signal path. The remote unit also comprises a control circuit. The control circuit is configured to receive the measured power of the leaked intermodulation product from the measurement circuit. The control circuit is also configured to determine a selected number of power amplifiers among the plurality of power amplifiers for reducing the measured power of the leaked intermodulation product to a predetermined threshold. The control circuit is also configured to control the power amplifier circuit to enable the determined selected number of power amplifiers among the plurality of power amplifiers.

In another aspect, a method for suppressing a leaked intermodulation product in an uplink signal path in a remote unit in a WDS is provided. The method comprises measuring a power of a leaked intermodulation product caused by at least one intermodulation product leaked from a downlink signal path into an uplink signal path. The method also comprises determining a selected number of power amplifiers among a plurality of power amplifiers in a power amplifier circuit in the remote unit for reducing the measured power of the leaked intermodulation product to a predetermined threshold. The method also comprises controlling the power amplifier circuit to enable the determined selected number of power amplifiers among the plurality of power amplifiers.

In another aspect, a WDS is provided. The WDS comprises a central unit. The WDS also comprises a plurality of remote units. The plurality of remote units is configured to receive a plurality of downlink communications signals from the central unit. The plurality of remote units is also configured to provide a plurality of uplink communications signals to the central unit. One or more remote units among the plurality of remote units each comprise a power amplifier circuit in a downlink signal path comprising a plurality of power amplifiers. The power amplifier circuit is configured to receive a downlink RF signal in the downlink signal path of the remote unit. The downlink RF signal comprises at least one first downlink RF signal and at least one second downlink RF signal. The power amplifier circuit is also configured to amplify the downlink RF signal to generate an amplified downlink RF signal comprising at least one amplified first downlink RF signal, at least one amplified second downlink RF signal, and at least one intermodulation product caused by power amplification of the at least one first downlink RF signal and the at least one second downlink RF signal. The one or more remote units among the plurality of remote units each also comprise a measurement circuit coupled to an uplink signal path of the remote unit. The measurement circuit is configured to measure a power of a leaked intermodulation product caused by the at least one intermodulation product leaked from the downlink signal path into the uplink signal path. The one or more remote units among the plurality of remote units each also comprise a control circuit. The control circuit is configured to receive the measured power of the leaked intermodulation product from the measurement circuit. The control circuit is also configured to determine a selected number of power amplifiers among the plurality of power amplifiers for reducing the measured power of the leaked intermodulation product to a predetermined threshold. The control circuit is also configured to control the power amplifier circuit to enable the determined selected number of power amplifiers among the plurality of power amplifiers.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

DETAILED DESCRIPTION

Embodiments of the disclosure relate to reducing power consumption in a remote unit of a wireless distribution system (WDS) for intermodulation product suppression. In exemplary aspects disclosed herein, one or more remote units in a WDS are configured to receive a downlink radio frequency (RF) signal in a downlink signal path. The remote units amplify the downlink RF signal using a power amplifier circuit before communicating to client devices. Because intermodulation products of the downlink RF signal generated as a result of the non-linearity of the power amplifier circuit may leak from the downlink signal path into an uplink signal path, thus degrading sensitivity of the uplink signal path, the remote units are configured to reduce the power of these leaked intermodulation products. In this regard, remote units in the WDS include a power amplifier circuit that includes a plurality of power amplifiers each configured to receive and amplify downlink RF signals in the downlink signal path. To reduce power of these leaked intermodulation products, the remote units are configured to measure the power of these leaked intermodulation products in the uplink signal path. The remote units are configured to enable a selected number of power amplifiers among the plurality of power amplifiers to amplify the downlink RF signals based on the measured power of the leaked intermodulation products. The selected number of power amplifiers is determined to amplify the downlink RF signal to a desired power for communicating to the client devices, while reducing the power of the leaked intermodulation products to be below a predetermined threshold. In a non-limiting example, the selected number of power amplifiers is a minimum number of power amplifiers among the plurality of power amplifiers required to amplify the downlink RF signal to the desired power for communicating to the client devices, while reducing the power of the leaked intermodulation products to be below the predetermined threshold. Given that the plurality of power amplifiers each consume a certain amount of power, enabling the selected number of power amplifiers can lead to reduced power consumption at the remote units. Hence, by enabling only the selected number of power amplifiers in the power amplifier circuit based on the measured power of the leaked intermodulation products in the uplink signal path, it is possible to avoid enabling an excessive number of power amplifiers, thus assisting in reducing power consumption for intermodulation product suppression.

Figure 2:
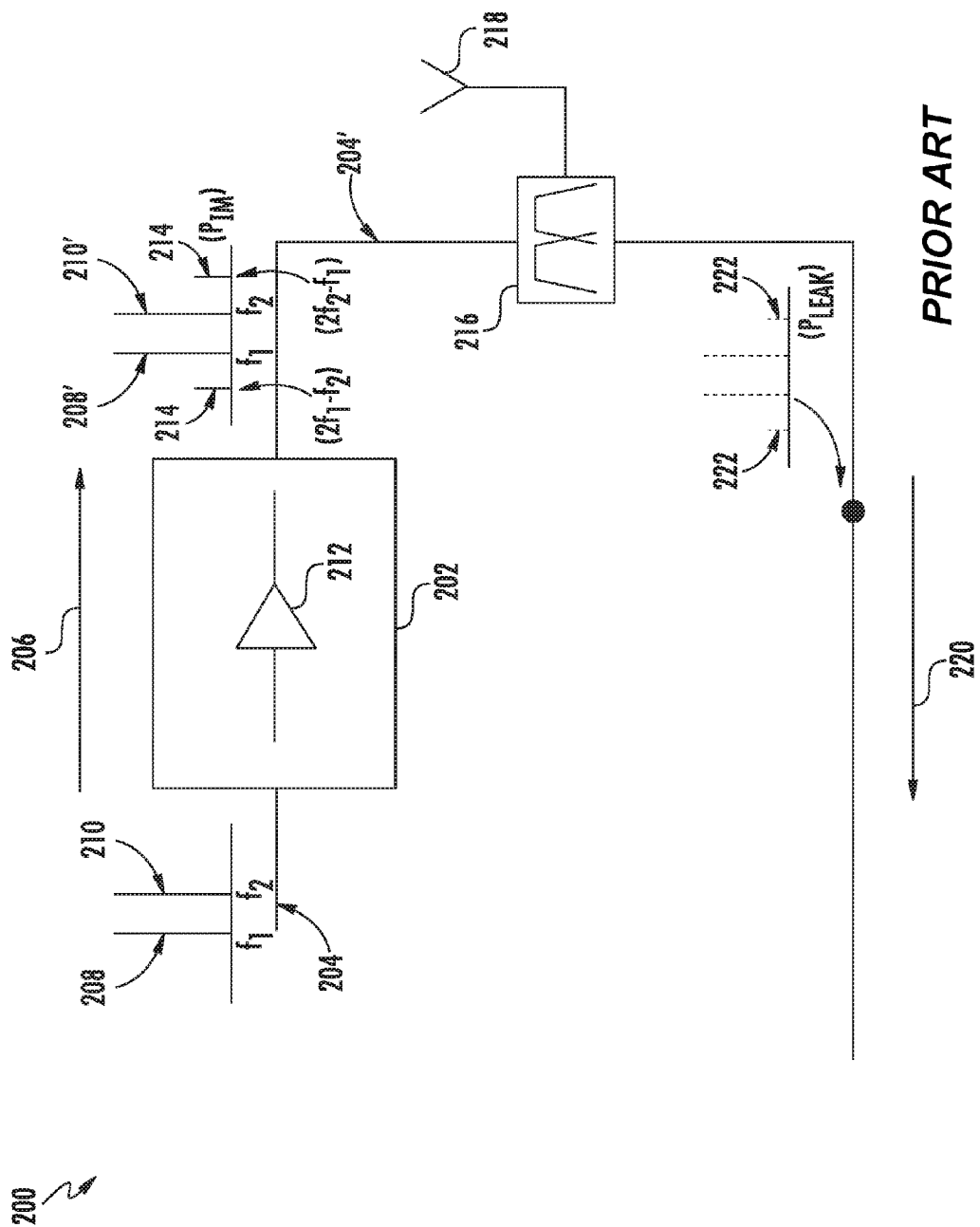
FIG. 2 is a schematic diagram of an exemplary remote unit that can be provided in a WDS, wherein the remote unit includes a power amplifier circuit in a downlink signal path that can generate an intermodulation product(s) when amplifying a downlink radio frequency (RF) signal, wherein the intermodulation product(s) can be leaked in an uplink signal path.
Figure 3:
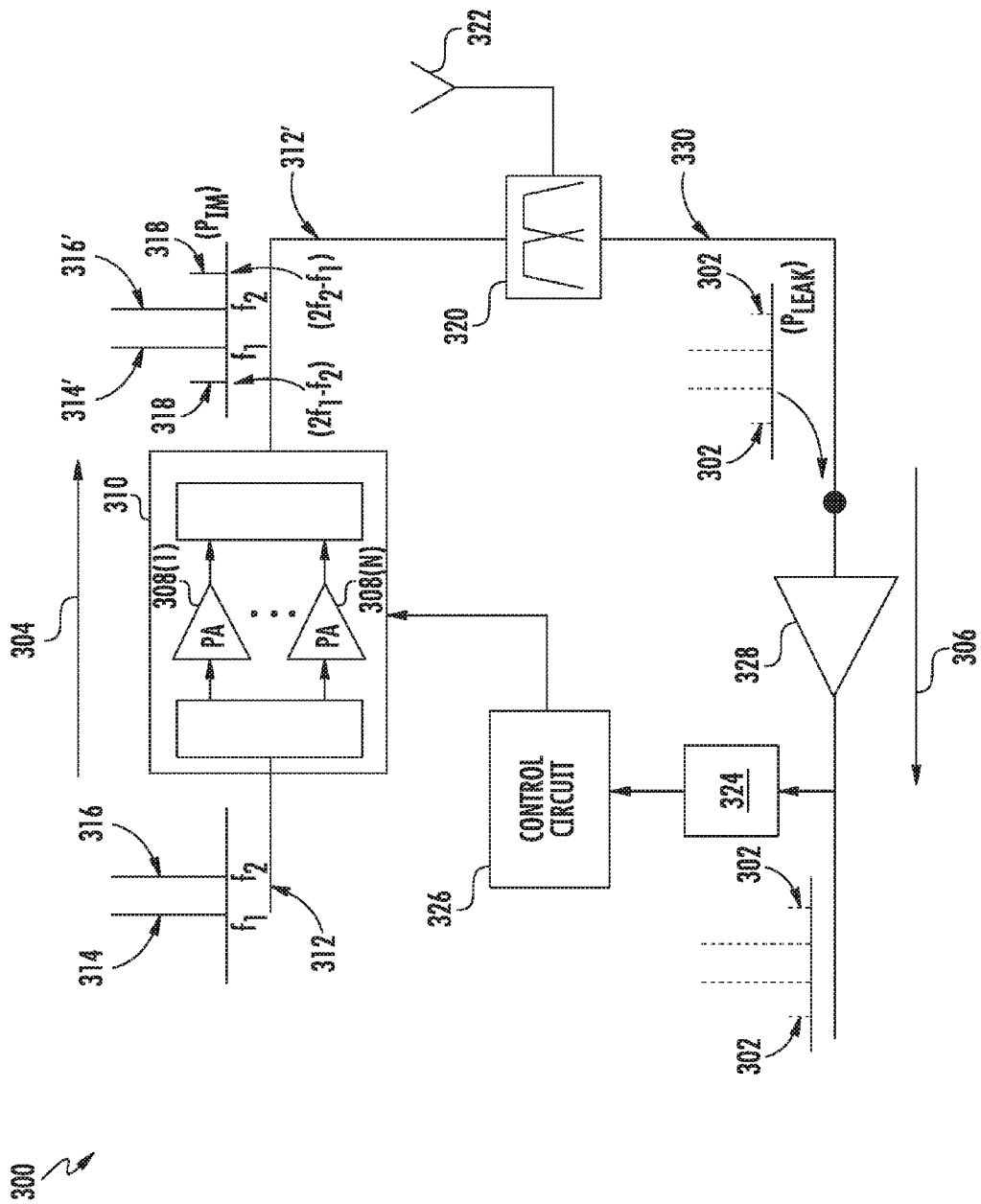
FIG. 3 is a schematic diagram of an exemplary remote unit that can be provided in a WDS, wherein the remote unit is configured to measure a power of a leaked intermodulation product(s) leaked from a downlink signal path into an uplink signal path in the remote unit and selectively enable power amplifiers in a power amplifier circuit based on the measured power of the leaked intermodulation product(s) to suppress the leaked intermodulation product(s) in a reduced power consumption configuration of the remote unit.

Before discussing examples of reducing power consumption for intermodulation product suppression in a remote unit in a WDS starting at FIG. 3, a discussion of an exemplary remote unit having a power amplifier circuit generating an intermodulation product(s) that can leak from a downlink signal path into an uplink signal path in the remote unit is first provided with reference to FIG. 2.

Figure 1:
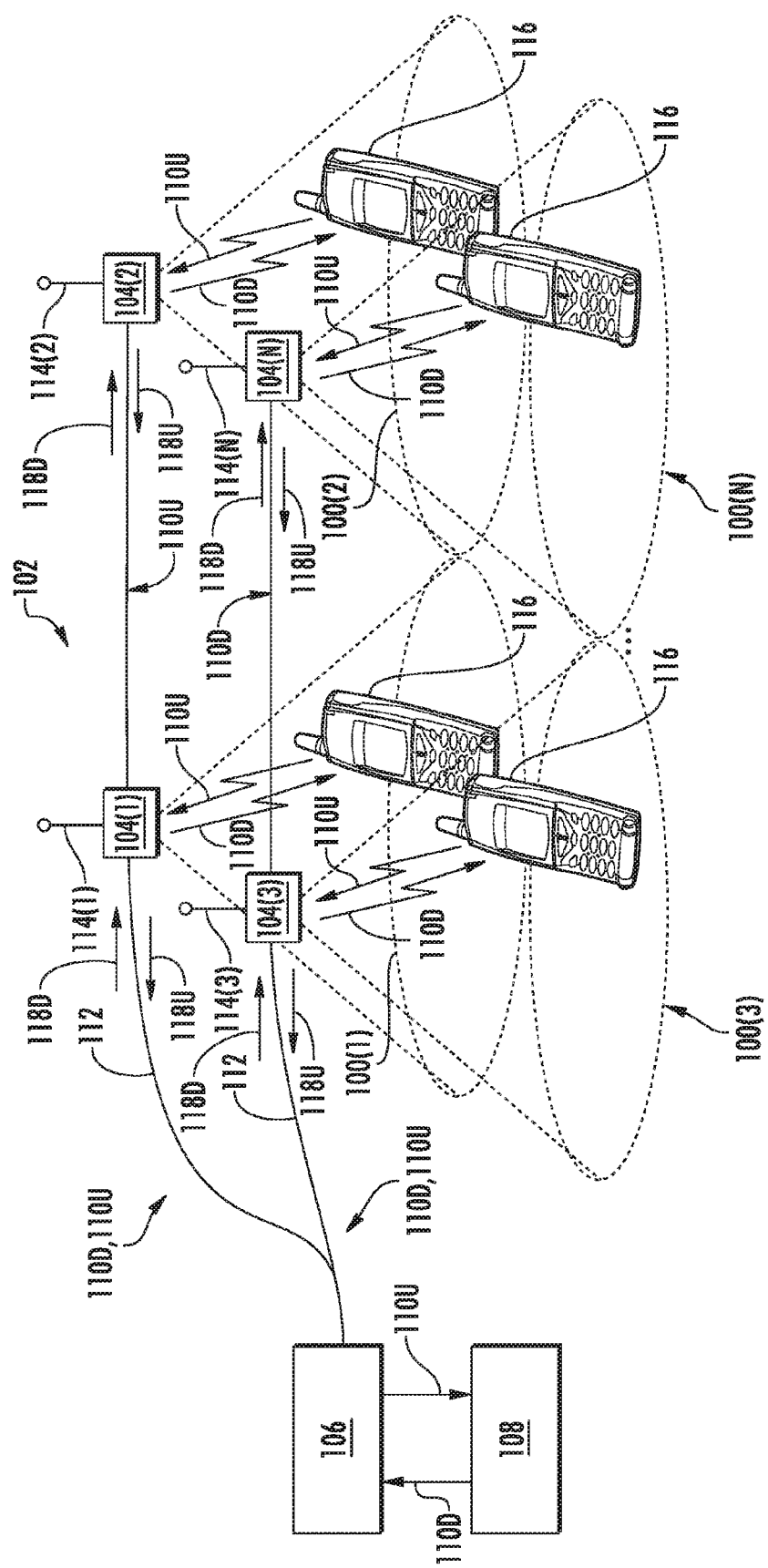
FIG. 1 is a schematic diagram of an exemplary wireless distribution system (WDS), which may be a distributed antenna system (DAS) for example.

In this regard, FIG. 2 is a schematic diagram of an exemplary remote unit 200 that can be provided in a WDS, such as the WDS 102 in FIG. 1 for example. The remote unit 200 includes a power amplifier circuit 202 to amplify received downlink RF signals 204 in a downlink signal path 206 to be distributed to client devices. For example, the downlink RF signal 204 could include at least one first downlink RF signal 208 and at least one second downlink RF signal 210 located at frequencies $f_1$ and $f_2$, respectively. In another example, the downlink RF signal 204 is a broadband RF signal occupying the RF spectrum between frequencies $f_1$ and $f_2$.

The power amplifier circuit 202 in the remote unit 200 includes at least one power amplifier 212, which can be a "class A" power amplifier, for example. The power amplifier 212 amplifies the downlink RF signal 204 to generate an amplified downlink RF signal 204'. The amplified downlink RF signal 204' includes an amplified first downlink RF signal 208', which is amplified based on the first downlink RF signal 208, and an amplified second downlink signal 210', which is amplified from the second downlink RF signal 210.

Due to non-linearity of the power amplifier 212, the power amplifier 212 generates an intermodulation product(s) 214 in the amplified downlink RF signal 204'. The intermodulation product(s) 214 generated by the power amplifier 212 further includes at least one third-order intermodulation product (IM3), at least one fifth-order intermodulation product (IM5), at least one seventh-order intermodulation product (IM7), and so on. For the convenience of illustration, the intermodulation product(s) 214 discussed herein refers to the third-order intermodulation product (IM3) as a non-limiting example. In this example, the intermodulation product(s) 214 that results from amplifying the first downlink RF signal 208 appears at frequencies $(2f_1-f_2)$ and $(2f_2-f_1)$ in the amplified first downlink RF signal 208'. In this regard, if the frequency $f_1$ of the first downlink RF signal 208 and the frequency $f_2$ of the second downlink RF signal 210 are 850 MHz and 870 MHz, respectively, then the intermodulation product(s) 214 would appear at 830 MHz and 890 MHz frequencies as a result of power amplification performed by the power amplifier 212. In this regard, the intermodulation product(s) 214 would fall into a frequency spectrum (e.g., 825-845 MHz), which is close to the frequencies $f_1$ and $f_2$, configured to provide uplink communications services.

With continuing reference to FIG. 2, the remote unit 200 also includes a coupling device 216, which may be a duplexer, a multiplexer, a hybrid combiner, or a combination of thereof, as examples. The coupling device 216 is configured to couple the downlink signal path 206 to an antenna 218 for downlink signal transmissions. The coupling device 216 is also configured to couple the antenna 218 to an uplink signal path 220 for uplink signal receptions. The coupling device 216 is designed to provide a required level of isolation between the downlink signal path 206 and the uplink signal path 220. However, since the coupling device 216 is designed to provide the isolation between the downlink signal path 206 and the uplink signal path 220 up to a certain level, the intermodulation product(s) 214 generated by the power amplifier 212 in the downlink signal path 206 could leak into the uplink signal path 220, thus generating a leaked intermodulation product(s) 222 in the uplink signal path 220. The leaked intermodulation product(s) 222 may degrade the sensitivity of the uplink signal path 220. Consequently, the remote unit 200 may not be able to receive and decode uplink signals with lower signal strength (e.g., lower signal-to-noise ratio (SNR)).

Power $P_{LEAK}$ of the leaked intermodulation product(s) 222 depends on power $P_{IM}$ of the intermodulation product(s) 214 and the isolation level of the coupling device 216, as expressed in the equation (Eq. 1) below.

$$P_{LEAK}=P_{IM}-(\text{Isolation Level}) \quad (\text{Eq. 1})$$

In this regard, for a given isolation level of the coupling device 216, the higher the power $P_{IM}$ of the intermodulation product(s) 214 in the downlink signal path 206, the higher the power $P_{LEAK}$ of the leaked intermodulation product(s) 222 in the uplink signal path 220. Conversely, for a given power $P_{IM}$ of the intermodulation product(s) 214 in the downlink signal path 206, the higher the isolation level of the coupling device 216, the lower the power $P_{LEAK}$ of the leaked intermodulation product(s) 222 in the uplink signal path 220. In fact, both factors (the power $P_{IM}$ of the intermodulation product(s) 214 and the isolation level of the coupling device 216) may have relatively high variance even among identical components and/or circuits (e.g., identical power amplifier 212 and/or identical coupling device 216). As a result, the power $P_{LEAK}$ of the leaked intermodulation product(s) 222 may vary depending on individual characteristics of the power amplifier 212 and specific downlink and/or uplink frequencies in use.

In a non-limiting example, the isolation level of the coupling device 216 is 50 dB and the power $P_{IM}$ of the intermodulation product(s) 214 is −40 dBm. According to Eq. 1 above, the power $P_{LEAK}$ of the leaked intermodulation product(s) 222 in the uplink signal path 220 would be −90 dBm. As a result, sensitivity of the uplink signal path 220 will be lowered to (−90 dBm+SNR(Min)), wherein SNR (Min) is a minimal difference (in dB) between a power of an uplink signal and noises/interferences in the uplink signal path 220 for detecting and decoding the uplink signal correctly. If the SNR(Min) is 12 dB, for example, it would mean that power of the uplink signal needs to be at least 78 dBm to become detectable and decodable in the uplink signal path 220.

Continuing with the example above, if the power of the uplink signal in the uplink signal path 220 is required to be −85 dBm for detectability in the uplink signal path 220, for example, then the power $P_{LEAK}$ of the leaked intermodulation product(s) 222 needs to be lower than −97 dBm. A common practice for reducing the power $P_{IM}$ of the intermodulation product(s) 214 in the downlink signal path 206, and thus the power $P_{LEAK}$ of the leaked intermodulation product(s) 222 in the uplink signal path 220 as a result, is to use the power amplifier 212 with relatively high back off. This means that the actual output power of the power amplifier 212 is significantly lower than a maximum output power that the power amplifier 212 can deliver. However, since the power amplifier 212 is typically a "class A" power amplifier, power consumption of the power amplifier 212 is determined by the maximum output power of the power amplifier 212 as opposed to the actual output power. In this regard, the power amplifier 212 would consume excessive power even though the power amplifier 212 is not generating the maximum output power. As such, it may be desirable to be able to measure the power $P_{LEAK}$ of the leaked intermodulation product(s) 222 in the uplink signal path 220, and configure the power amplifier circuit 202 accordingly to help reduce power consumption associated with suppressing the leaked intermodulation product(s) 222 in the uplink signal path 220.

In this regard, FIG. 3 is a schematic diagram of an exemplary remote unit 300 that can be provided in a WDS, wherein the remote unit 300 is configured to measure a power $P_{LEAK}$ of at least one leaked intermodulation product 302 leaked from a downlink signal path 304 into an uplink signal path 306 in the remote unit 300 and selectively enable a selected number of power amplifiers among a plurality of power amplifiers 308(1)-308(N) in a power amplifier circuit 310 based on the measured power of the leaked intermodulation product 302. The power amplifier circuit 310 receives a downlink RF signal 312 in the downlink signal path 304. The downlink RF signal 312 includes at least one first downlink RF signal 314 and at least one second downlink RF signal 316 located at frequencies $f_1$ and $f_2$, respectively. The power amplifier circuit 310 is configured to amplify the downlink RF signal 312 to generate an amplified downlink RF signal 312'. The amplified downlink RF signal 312' includes at least one amplified first downlink RF signal 314', which is amplified based on the first downlink RF signal 314, and at least one amplified second downlink RF signal 316', which is amplified based on the second downlink RF signal 316.

Due to non-linearity of the power amplifier circuit 310, the power amplifier circuit 310 generates at least one intermodulation product 318 in the amplified downlink RF signal 312'. The intermodulation product 318 includes at least one third-order intermodulation product (IM3), at least one fifth-order intermodulation product (IM5), at least one seventh-order intermodulation product (IM7), and so on. For the convenience of illustration, the intermodulation product 318 discussed hereinafter refers to the third-order intermodulation product (IM3) in a non-limiting example. It shall be appreciated that the exemplary aspects discussed hereinafter with reference to the third-order intermodulation product (IM3) are applicable to the higher order intermodulation products (e.g., IM5, IM7, etc.) as well. The intermodulation product 318 has a power $P_{IM}$.

The remote unit 300 includes a coupling device 320 for coupling the downlink signal path 304 and the uplink signal path 306 to an antenna 322. The coupling device 320 causes the intermodulation product 318 to leak from the downlink signal path 304 into the uplink signal path 306. The remote unit 300 includes a measurement circuit 324 configured to measure the power of the leaked intermodulation product 302 in the uplink signal path 306. The remote unit 300 also includes a control circuit 326, which can be a field-programmable gate array (FPGA), a microprocessor, or a microcontroller, for example. In a non-limiting example, the control circuit 326 includes the measurement circuit 324. The control circuit 326 receives the measured power $P_{LEAK}$ of the leaked intermodulation product 302 from the measurement circuit 324. Since isolation level of the coupling device 320 is typically known from specification of the coupling device 320, the control circuit 326 can thus determine the power $P_{IM}$ of the intermodulation product 318 based on Eq. 1 above.

With continuing reference to FIG. 3, in a non-limiting example, the power amplifier circuit 310 can be a balanced power amplifier circuit that includes the power amplifiers 308(1)-308(N), wherein N=$2^M$ and M≥2. In this regard, the power amplifier circuit 310 includes at least four of the power amplifiers 308(1)-308(N) in the power amplifier circuit 310. As is further discussed later in FIGS. 5A and 5B, it is possible to reduce the power $P_{IM}$ of the intermodulation product 318 to be below a given value in the downlink signal path 304 by enabling at least a selected number of power amplifiers among the power amplifiers 308(1)-308(N) in the power amplifier circuit 310. As a result, the power $P_{LEAK}$ of the leaked intermodulation product 302 can be reduced to a predetermined threshold in the uplink signal path 306 according to Eq. 1.

In this regard, the control circuit 326 can determine the selected number of power amplifiers among the power amplifiers 308(1)-308(N) based on the measured power $P_{LEAK}$ of the leaked intermodulation product 302 in the uplink signal path 306. In a non-limiting example, the control circuit 326 can compare the measured power $P_{LEAK}$ against the predetermined threshold to determine the selected number of power amplifiers among the power amplifiers 308(1)-308(N) to be enabled. Accordingly, the control circuit 326 controls the power amplifier circuit 310 to enable the determined selected number of power amplifiers among the power amplifiers 308(1)-308(N) for reducing the measured power $P_{LEAK}$ of the leaked intermodulation product 302 to the predetermined threshold.

In a non-limiting example, the selected number of power amplifiers enabled by the control circuit 326 among the power amplifiers 308(1)-308(N) are the minimal or least number of power amplifiers required to reduce the power $P_{LEAK}$ to the predetermined threshold in the uplink signal path 306. For example, if the control circuit 326 determines that at least two power amplifiers among the power amplifiers 308(1)-308(N) need to be enabled to reduce the power $P_{LEAK}$ to the predetermined threshold, the control circuit 326 may only enable two power amplifiers among the power amplifiers 308(1)-308(N), as opposed to enabling more than two power amplifiers among the power amplifiers 308(1)-308(N). To assist in reducing power consumption of the power amplifier circuit 310 and thus the remote unit 300 as a whole, the control circuit 326 may further disable power amplifiers among the power amplifiers 308(1)-308(N) that are not among the selected number of power amplifiers for reducing the measured power $P_{LEAK}$ to the predetermined threshold. As a result, the remote unit 300 can avoid enabling an excessive number of power amplifiers with relatively high back off, thus helping to reduce power consumption for intermodulation product suppression. Hence, by determining the selected number of power amplifiers among the power amplifiers 308(1)-308(N) based on the measured power $P_{LEAK}$ of the leaked intermodulation product 302 and only enabling the selected number of power amplifiers among the power amplifiers 308(1)-308(N), the control circuit 326 can avoid enabling an excessive number of power amplifiers in the power amplifier circuit 310, thus reducing power consumption for suppressing the leaked intermodulation product 302 in the uplink signal path 306.

Figure 4:
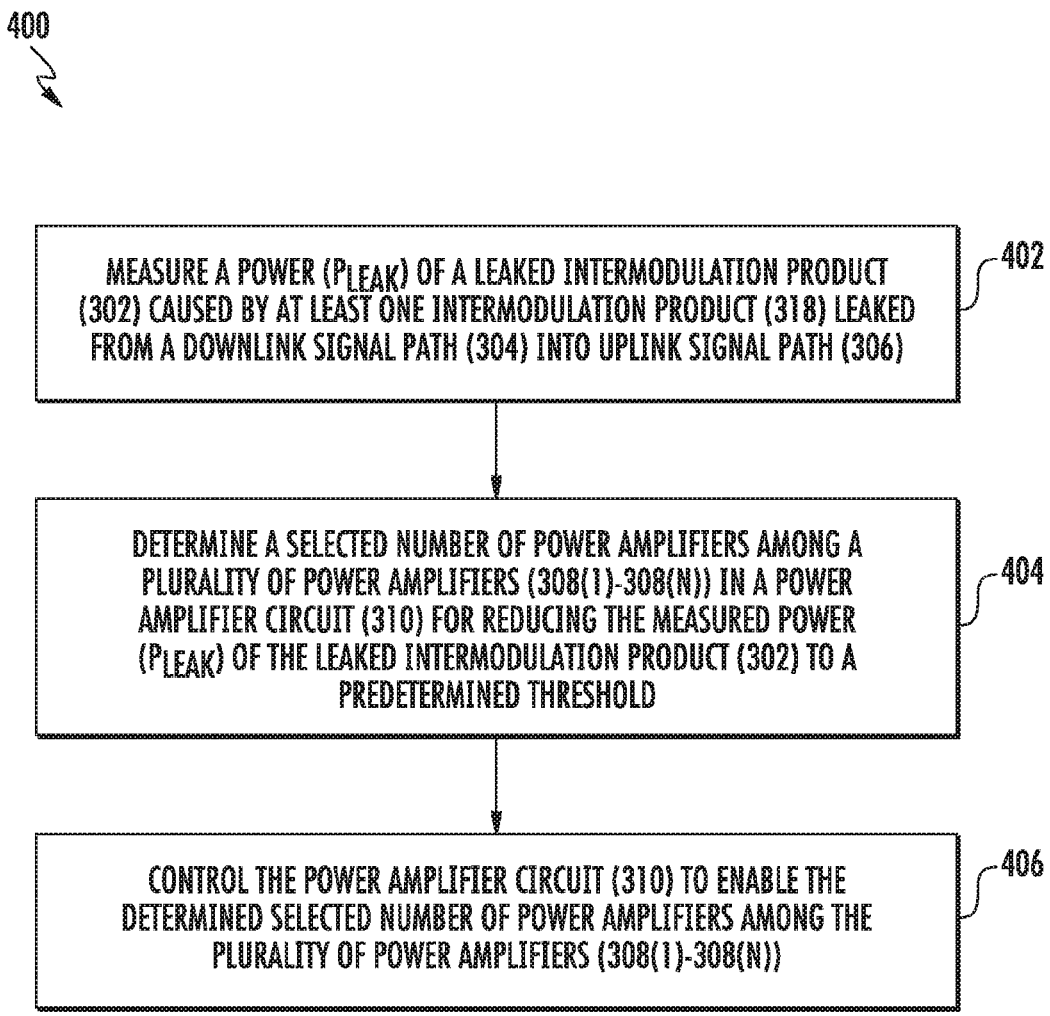
FIG. 4 is a flowchart of an exemplary process that may be employed in the remote unit of FIG. 3 for suppressing a leaked intermodulation product(s) in a reduced power consumption configuration of the remote unit.

The remote unit 300 can be configured to suppress the leaked intermodulation product 302 in the uplink signal path 306 according to a process that can help reduce power consumption in the remote unit 300 by determining the selected number of power amplifiers among the power amplifiers 308(1)-308(N) based on the measured power $P_{LEAK}$ of the leaked intermodulation product 302 and only enabling the selected number of power amplifiers among the power amplifiers 308(1)-308(N). In this regard, FIG. 4 is a flowchart of an exemplary process 400 that may be employed in the remote unit 300 of FIG. 3 for suppressing the leaked intermodulation product 302 in a reduced power consumption of the remote unit 300. The process 400 in FIG. 4 is discussed in conjunction with the remote unit 300 in FIG. 3.

With reference to FIG. 4, the measurement circuit 324 measures the power $P_{LEAK}$ of the leaked intermodulation product 302 caused by the intermodulation product 318 leaked from the downlink signal path 304 into the uplink signal path 306 (block 402). The control circuit 326 determines the selected number of power amplifiers among the power amplifiers 308(1)-308(N) in the power amplifier circuit 310 for reducing the measured power $P_{LEAK}$ of the leaked intermodulation product 302 to the predetermined threshold (block 404). The control circuit 326 controls the power amplifier circuit 310 to enable the determined selected number of power amplifiers among the power amplifiers 308(1)-308(N) (block 406).

With reference back to FIG. 3, in a first non-limiting example, the remote unit 300 is placed under a test or configuration mode, in which the coupling device 320 decouples the antenna 322 from the uplink signal path 306. In this regard, the power amplifier circuit 310 receives the downlink RF signal 312 as a test signal from a signal generator coupled to the remote unit 300. The remote unit 300 may include an uplink power amplifier 328 configured to amplify the leaked intermodulation product 302 before being measured by the measurement circuit 324. Given that RF characteristics of the test signal are controllable via the signal generator, it is possible to configure the signal generator to generate the downlink RF signal 312 with the same RF characteristics as the downlink RF signal 312 would have in a live WDS. Further, by decoupling the antenna 322 from the uplink signal path 306, only the leaked intermodulation product 302 will appear in the uplink signal path 306. As such, it is possible to measure the power $P_{LEAK}$ of the leaked intermodulation product 302 with improved accuracy.

However, measuring the power $P_{LEAK}$ of the leaked intermodulation product 302 when the remote unit 300 is in the test or configuration mode could change when the remote unit 300 is turned on for live service. As such, it may be necessary to adjust the measured power $P_{LEAK}$ when the remote unit 300 is also receiving an uplink RF signal 330 from client devices via the antenna 322. Thus, in a second non-limiting example, the remote unit 300 provides downlink and uplink communications services to the client devices while the power $P_{LEAK}$ of the leaked intermodulation product 302 is measured. As such, the power amplifier circuit 310 receives the downlink RF signal 312 from a signal source (e.g., a base transceiver station (BTS), a baseband unit (BBU), etc.) that is communicatively coupled to the remote unit 300. The coupling device 320 couples the antenna 322 to the uplink signal path 306 to provide the uplink RF signal 330 received from the client devices via the antenna 322 to the uplink signal path 306. In this regard, the uplink signal path 306 includes both the leaked intermodulation product 302 and the received uplink RF signal 330. The measurement circuit 324 is configured to measure the power $P_{LEAK}$ of the leaked intermodulation product 302 between the leaked intermodulation product 302 and the uplink RF signal 330 received from the client devices.

As mentioned previously, it is possible to reduce the power $P_{IM}$ of the intermodulation product 318 to be below a given value in the downlink signal path 304 by enabling at least a selected number of power amplifiers among the power amplifiers 308(1)-308(N) in the power amplifier circuit 310. Exemplary aspects related to the power amplifier circuit 310 provided as a balanced power amplifier circuit are now discussed with references to FIGS. 5A and 5B.

Figure 5A:
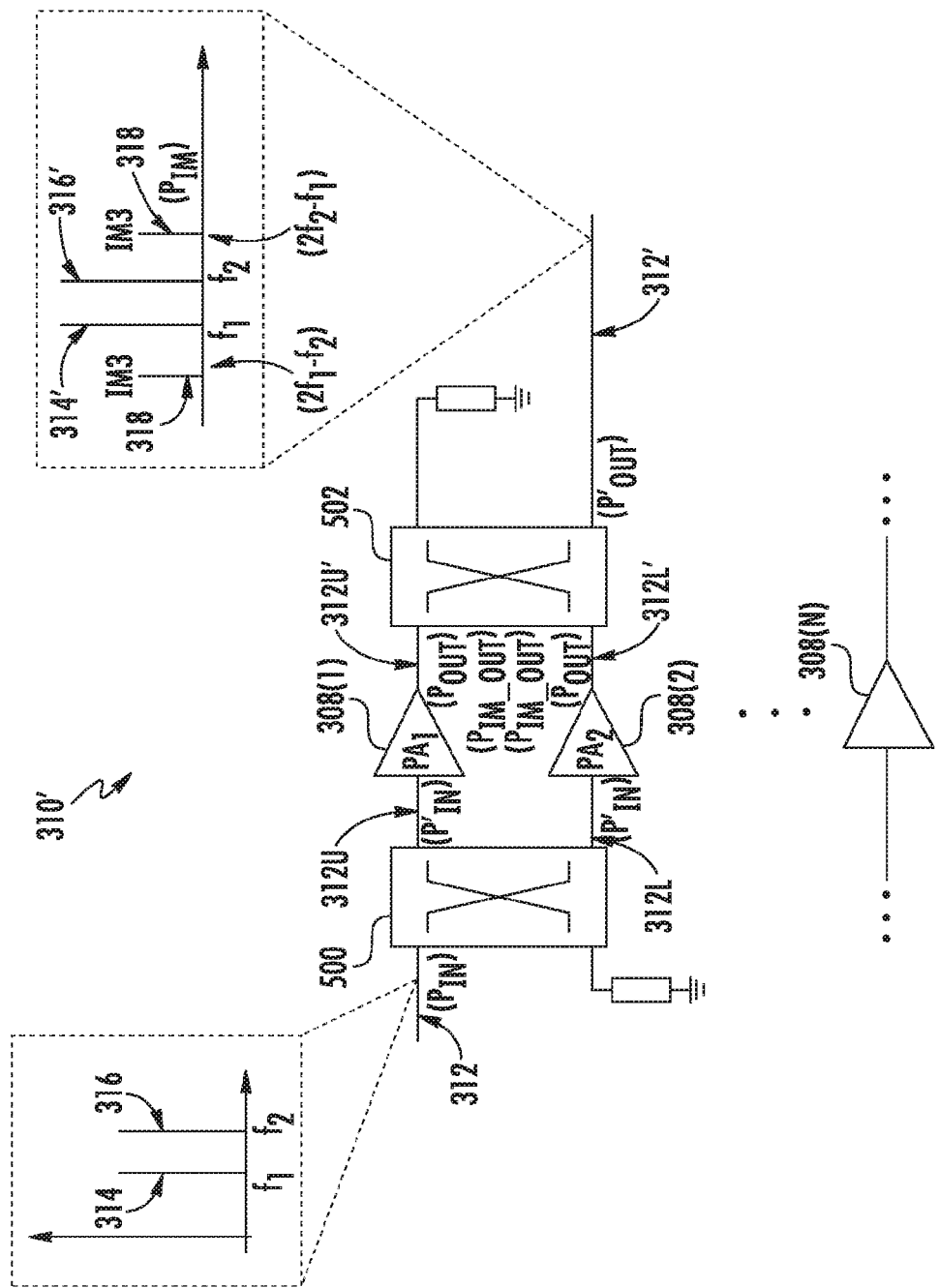
FIG. 5A is a schematic diagram of an exemplary balanced power amplifier circuit that can be provided as the power amplifier circuit in the remote unit of FIG. 3 in which two power amplifiers among a plurality of power amplifiers can be selectively enabled to reduce a power of an intermodulation product in the downlink signal path.

In this regard, FIG. 5A is a schematic diagram of an exemplary balanced power amplifier circuit 310' that can be provided as the power amplifier circuit 310 of in the remote unit 300 of FIG. 3 in which two power amplifiers 308(1), 308(2) among the power amplifiers 308(1)-308(N) can be selectively enabled to reduce the power $P_{IM}$ of the intermodulation product 318 in the downlink signal path 304. Common elements between FIGS. 3 and 5A are shown therein with common element numbers and will not be re-described herein.

With reference to FIG. 5A, the balanced power amplifier circuit 310' includes a first hybrid splitter combiner 500 and a second hybrid splitter combiner 502. The first hybrid splitter combiner 500 receives the downlink RF signal 312 at a power $P_{IN}$ and splits the downlink RF signal 312 into an upper downlink RF signal 312U and a lower downlink RF signal 312L. The upper downlink RF signal 312U and the lower downlink RF signal 312L are 90° phase shifted and each have a power $P'_{IN}$ that is approximately one-half of the power $P_{IN}$. In this regard, the power $P'_{IN}$ is approximately 3 dB less than the power $P_{IN}$, as expressed in equation (Eq. 2) below.

$$P'_{IN}=P_{IN}-3 \text{ dB} \tag{Eq. 2}$$

Each of the power amplifiers 308(1), 308(2) has pre-defined parameters (e.g., predefined by a manufacturer as part of the device specification) such as an amplifier gain G and an output third-order intercept point $IP3_{OUT}$. The power amplifiers 308(1), 308(2) are configured to amplify the upper downlink RF signal 312U and the lower downlink RF signal 312L to generate an amplified upper downlink RF signal 312U' and an amplified lower downlink RF signal 312L', respectively. As such, the amplified upper downlink RF signal 312U' and the amplified lower downlink RF signal 312L' each include the amplified first downlink RF signal 314' and the amplified second downlink RF signal 316'. In addition, due to non-linearity of the power amplifiers 308(1), 308(2), the amplified upper downlink RF signal 312U' and the amplified lower downlink RF signal 312L' also each include the intermodulation product 318.

The amplified first downlink RF signal 314' and the amplified second downlink RF signal 316' generated by the power amplifiers 308(1), 308(2) are both at a power $P_{OUT}$, as determined based on the equation (Eq. 3) below.

$$P_{OUT}=P'_{IN}+G=(P_{IN}-3 \text{ dB})+G \tag{Eq. 3}$$

The intermodulation product 318 generated by the power amplifiers 308(1), 308(2) has a power $P_{IM\_OUT}$, which can be determined based on the equation (Eq. 4) below.

$$P_{IM\_OUT}=P_{OUT}-2\times(IP3_{OUT}-P_{OUT}) \tag{Eq. 4}$$

The second hybrid splitter combiner 502 receives and combines the amplified upper downlink RF signal 312U' and the amplified lower downlink RF signal 312L' to generate the amplified downlink RF signal 312'. By swapping respective phases of the amplified upper downlink RF signal 312U' and the amplified lower downlink RF signal 312L', the second hybrid splitter combiner 502 adds approximately 3 dB to the power $P_{OUT}$ of the amplified upper downlink RF signal 312U' and the amplified lower downlink RF signal 312L'. As a result, the amplified downlink RF signal 312' will have a power $P'_{OUT}$ according to the equation (Eq. 5) below.

$$P'_{OUT}=P_{IN}-3 \text{ dB}+G+3 \text{ dB}=P_{IN}G \tag{Eq. 5}$$

The intermodulation product 318 in the amplified upper downlink RF signal 312U' and the amplified lower downlink RF signal 312L' are combined in-phase by the second hybrid splitter combiner 502. As such, the power $P_{IM}$ of the intermodulation product 318 in the amplified downlink RF signal 312' is also approximately 3 dB higher than the power $P_{IM\_OUT}$, as expressed in the equation (Eq. 6) below.

$$P_{IM}=P_{IM\_OUT}+3 \text{ dB} \tag{Eq. 6}$$

In a non-limiting example, assuming that the power $P_{IN}$ is −30 dBm, the amplifier gain G is 24 dB and the output third-order intercept point $IP3_{OUT}$ is 29 dBm. According to Eq. 2, the power $P'_{IN}$ of the upper downlink RF signal 312U and the lower downlink RF signal 312L equals −33 dBm. According to Eq. 3, the power $P_{OUT}$ of the amplified upper downlink RF signal 312U' and the amplified lower downlink RF signal 312L' equals −9 dBm. Further, according to Eq. 4, the power $P_{IM\_OUT}$ of the intermodulation product 318 generated by the power amplifiers 308(1), 308(2) equals −85 dBm. As such, the power $P_{IM}$ of the intermodulation product 318 in the amplified downlink RF signal 312', as calculated based on Eq. 6, will be −82 dBm.

Figure 5B:
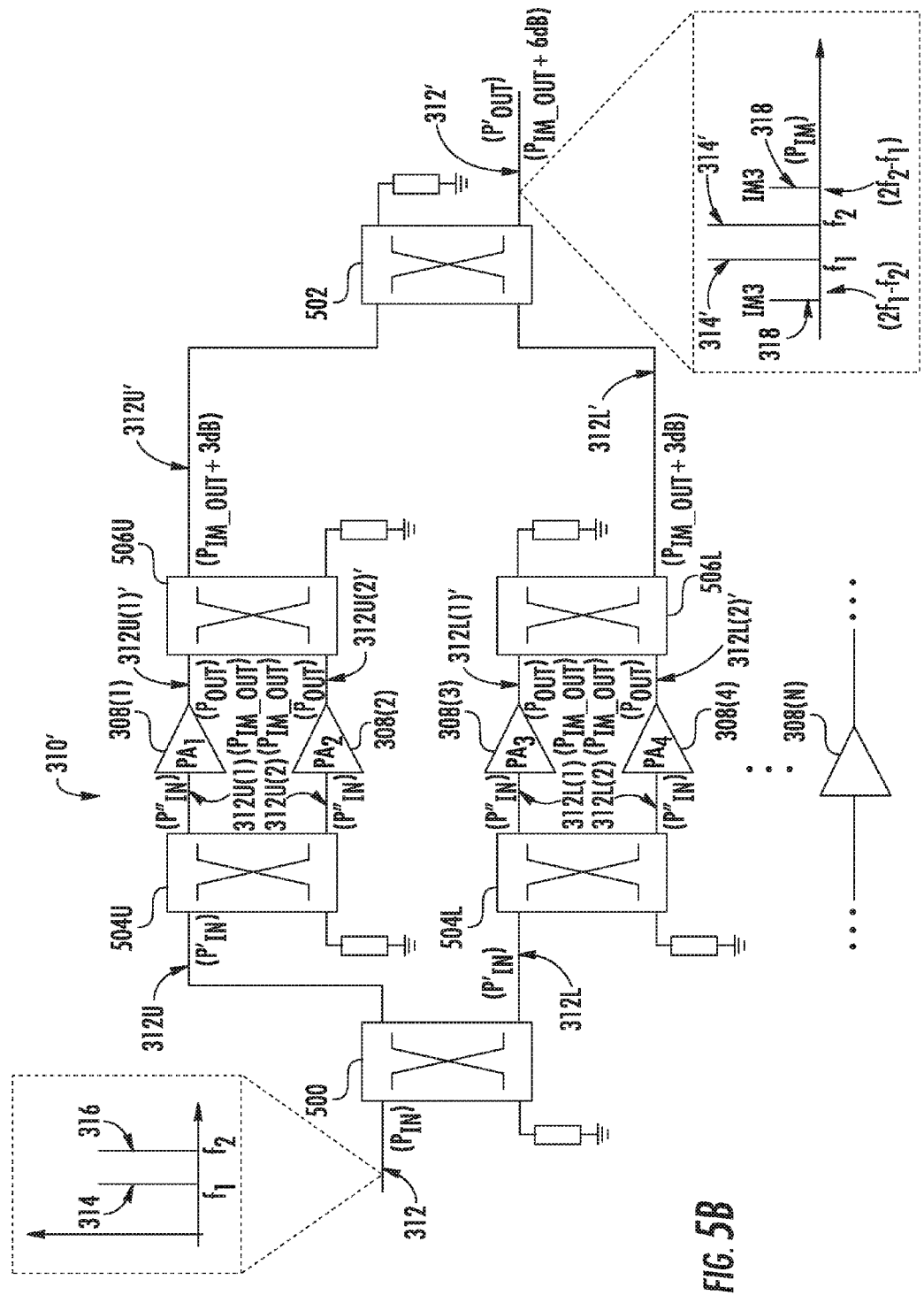
FIG. 5B is a schematic diagram of an exemplary illustration of the balanced power amplifier circuit of FIG. 5A that can be provided as the power amplifier circuit in the remote unit of FIG. 3 in which four power amplifiers among a plurality of power amplifiers can be selectively enabled to reduce a power of an intermodulation product in the downlink signal path.

The power $P_{IM}$ of the intermodulation product 318 can be further reduced by enabling additional power amplifiers among the power amplifiers 308(1)-308(N) in the balanced power amplifier circuit 310'. In this regard, FIG. 5B is a schematic diagram of an exemplary illustration of the balanced power amplifier circuit 310' of FIG. 5A that can be provided as the power amplifier circuit in the remote unit 300 of FIG. 3 in which four power amplifiers 308(1)-308(4) among the power amplifiers 308(1)-308(N) can be selectively enabled to reduce the power $P_{IM}$ of the intermodulation product 318 in the downlink signal path 304. Common elements between FIGS. 3, 5A, and 5B are shown therein with common element numbers and will not be re-described herein.

With reference to FIG. 5B, the balanced power amplifier circuit 310' further includes a first upper hybrid splitter combiner 504U, a first lower hybrid splitter combiner 504L, a second upper hybrid splitter combiner 506U, and a second lower hybrid splitter combiner 506L. The first upper hybrid splitter combiner 504U receives the upper downlink RF signal 312U at the power $P'_{IN}$ and splits the upper downlink RF signal 312U into a first upper downlink RF signal 312U(1) and a second upper downlink RF signal 312U(2). The first upper downlink RF signal 312U(1) and the second upper downlink RF signal 312U(2) each have a power $P''_{IN}$ that is approximately one-half of the power $P'_{IN}$. In this regard, the power $P''_{IN}$ is approximately 3 dB less than the power $P'_{IN}$ and, thus, approximately 6 dB less than the power $P_{IN}$.

The first lower hybrid splitter combiner 504L receives the lower downlink RF signal 312L at the power $P'_{IN}$ and splits the lower downlink RF signal 312L into a first lower downlink RF signal 312L(1) and a second lower downlink RF signal 312L(2). Similarly, the first lower downlink RF signal 312L(1) and the second lower downlink RF signal 312L(2) each have the power $P''_{IN}$ that is approximately 3 dB less than the power $P'_{IN}$ and approximately 6 dB less than the power $P_{IN}$.

The power amplifier 308(1) (first power amplifier), the power amplifier 308(2) (second power amplifier), the power amplifier 308(3) (third power amplifier), and the power amplifier 308(4) (fourth power amplifier) amplify the first upper downlink RF signal 312U(1), the second upper downlink RF signal 312U(2), the first lower downlink RF signal 312L(1), and the second lower downlink RF signal 312L(2) to generate an amplified first upper downlink RF signal 312U(1)', an amplified second upper downlink RF signal 312U(2)', an amplified first lower downlink RF signal 312L(1)', and an amplified second lower downlink RF signal 312L(2)', respectively. Each of the amplified first upper downlink RF signal 312U(1)', the amplified second upper downlink RF signal 312U(2)', the amplified first lower downlink RF signal 312L(1)', and the amplified second lower downlink RF signal 312L(2)' include the amplified first downlink RF signal 314' and the amplified second downlink RF signal 316' at the power $P_{OUT}$, which can be calculated based on the equation (Eq. 7) below.

$$P_{OUT} = P''_{IN} + G = (P_{IN} - 6 \text{ dB}) + G \qquad \text{(Eq. 7)}$$

Each of the amplified first upper downlink RF signal 312U(1)', the amplified second upper downlink RF signal 312U(2)', the amplified first lower downlink RF signal 312L(1)', and the amplified second lower downlink RF signal 312L(2)' also includes the intermodulation product 318 at the power $P_{IM\_OUT}$, which can be calculated based on the Eq. 4 above.

The intermodulation product 318 in the amplified first upper downlink RF signal 312U(1)' and the amplified second upper downlink RF signal 312U(2)' are combined in-phase by the second upper hybrid splitter combiner 506U. The second upper hybrid splitter combiner 506U combines the intermodulation product 318 in the amplified first upper downlink RF signal 312U(1)' and the amplified second upper downlink RF signal 312U(2)' to provide the intermodulation product 318, which is at a power of approximately ($P_{IM\_OUT}$+3 dB), in the amplified upper downlink RF signal 312U'. Likewise, second lower hybrid splitter combiner 506L combines the intermodulation product 318 in the amplified first lower downlink RF signal 312L(1)' and the amplified second lower downlink RF signal 312L(2)' to provide the intermodulation product 318, which is also at a power of approximately ($P_{IM\_OUT}$+3 dB), in the amplified lower downlink RF signal 312L'. The intermodulation product 318 in the amplified upper downlink RF signal 312U' and the amplified lower downlink RF signal 312L' is further combined in-phase by the second hybrid splitter combiner 502 to provide the intermodulation product 318 at the power $P_{IM}$, which is at approximately ($P_{IM\_OUT}$+6 dB), in the amplified downlink RF signal 312'.

According to the non-limiting example discussed in FIG. 5A, the power $P_{IN}$ is 30 dBm, the amplifier gain G is 24 dB, and the output third-order intercept point $IP3_{OUT}$ is 29 dBm. According to Eq. 7, the power $P_{OUT}$ of the amplified first upper downlink RF signal 312U(1)', the amplified second upper downlink RF signal 312U(2)', the amplified first lower downlink RF signal 312L(1)', and the amplified second lower downlink RF signal 312L(2)' equals –12 dBm. Further according to Eq. 4, the power $P_{IM\_OUT}$ of the intermodulation product 318 generated by the power amplifiers 308(1)-308(4) equals –94 dBm. As such, the power $P_{IM}$ of the intermodulation product 318 will be –88 dBm (–94 dBm+6 dB) in the amplified downlink RF signal 312'. As such, by enabling the four power amplifiers 308(1)-308(4), the balanced power amplifier circuit 310' in FIG. 5B can further reduce the power $P_{IM}$ of the intermodulation product 318 by approximately 6 dB, compared to the balanced power amplifier circuit 310' of FIG. 5A, in which only two power amplifiers 526(1), 526(2) are enabled.

With reference back to FIG. 3 and continuing with the non-limiting examples in FIGS. 5A and 5B, the balanced power amplifier circuit 310' of FIG. 5A and the balanced power amplifier circuit 310' of FIG. 5B can reduce the power $P_{IM}$ of the intermodulation product 318 to –82 dBm and –88 dBm, respectively, in the amplified downlink RF signal 312'. In a non-limiting example, the isolation level of the coupling device 320 is 50 dB, and the predetermined threshold for the leaked intermodulation product 302 is –130 dBm. According to Eq. 1, the balanced power amplifier circuit 310' of FIG. 5A can reduce the power $P_{LEAK}$ of the leaked intermodulation product 302 to –132 dBm. Likewise, the balanced power amplifier circuit 310' of FIG. 5B can reduce the power $P_{LEAK}$ of the leaked intermodulation product 302 to –138 dBm. As such, it is possible to reduce the power $P_{LEAK}$ in the leaked intermodulation product 302 to below the predetermined threshold by enabling the two power amplifiers 308(1), 308(2) of FIG. 5A or the four power amplifiers 308(1)-308(4) of FIG. 5B. However, since the four power amplifiers 308(1)-308(4) of FIG. 5B can consume more power than the two power amplifiers 308(1), 308(2) of FIG. 5A, the control circuit 326 would determine that the selected number of power amplifiers among the power amplifiers 308(1)-308(N) for reducing the power $P_{LEAK}$ of the leaked intermodulation product 302 to the predetermined threshold are the two power amplifiers 308(1), 308(2). As a result, the control circuit 326 would only enable the two power amplifiers 308(1), 308(2), as opposed to enabling the four power amplifiers 308(1)-308(4). The control circuit 326 may further disable the power amplifiers 308(3)-308(N) among the power amplifiers 308(1)-308(N) to help reduce power consumption in the balanced power amplifier circuit 310'.

Figure 6:
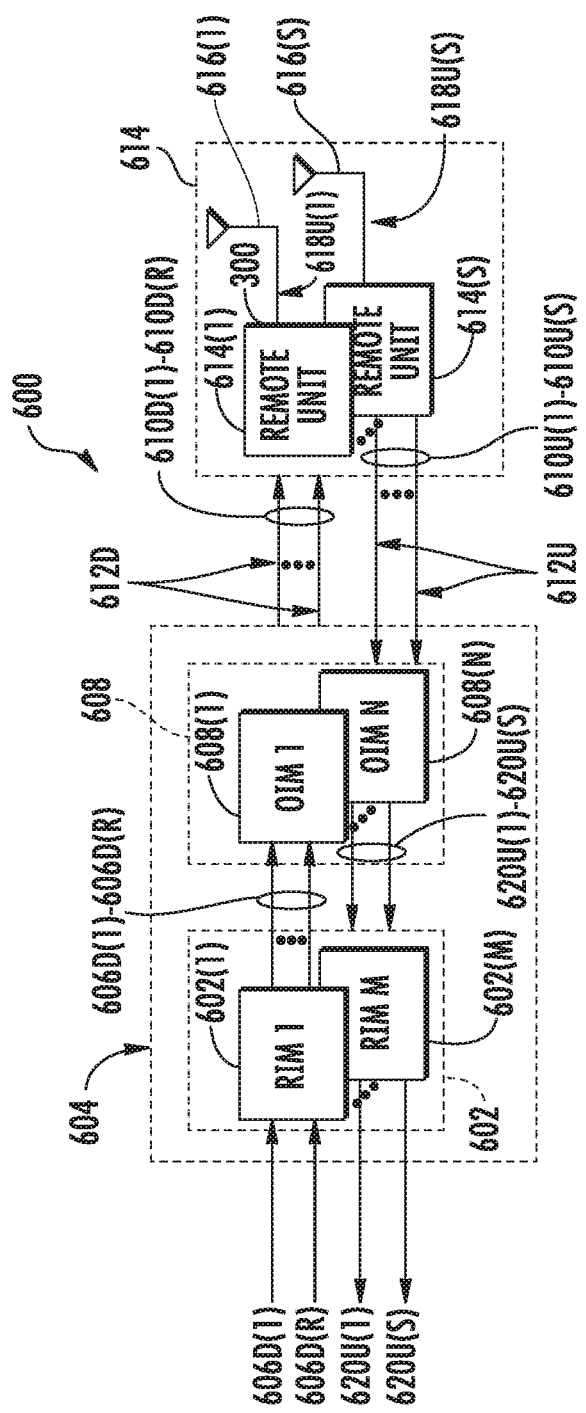
FIG. 6 is a schematic diagram of an exemplary WDS provided in the form of an optical fiber-based WDS that includes one or more remote units, such as the remote unit of FIG. 3, configured to measure the power of a leaked intermodulation product(s) leaked from a downlink signal path into an uplink signal path in the remote unit and selectively enable power amplifiers in a power amplifier circuit based on the measured power of the leaked intermodulation product(s) to suppress the leaked intermodulation product(s) in a reduced power consumption configuration of the remote unit.

FIG. 6 is a schematic diagram of an exemplary WDS 600 provided in the form of an optical fiber-based WDS that can include one or more remote units, including the remote unit 300 of FIG. 3, configured to measure the power of the leaked intermodulation product 302 leaked from the downlink signal path 304 into the uplink signal path 306 in the remote unit 300 and selectively enable power amplifiers 308(1)-308(N) in the power amplifier circuit 310 based on the measured power of the leaked intermodulation product 302 to suppress the leaked intermodulation product 302 in a reduced power consumption configuration of the remote unit 300. The WDS 600 includes an optical fiber for distributing communications services for multiple frequency bands. The WDS 600 in this example is comprised of three (3) main components in this example. A plurality of radio interfaces provided in the form of radio interface modules (RIMs) 602(1)-602(M) are provided in a central unit 604 to receive and process downlink digital communications signals 606D(1)-606D(R) prior to optical conversion into downlink optical fiber-based communications signals. The downlink digital communications signals 606D(1)-606D(R) may be received from a base station as an example. The RIMs 602(1)-602(M) provide both downlink and uplink interfaces for signal processing. The notations "1-R" and "1-M" indicate that any number of the referenced component, 1-R and 1-M, respectively, may be provided. The central unit 604 is configured to accept the RIMs 602(1)-602(M) as modular components that can easily be installed and removed or replaced in the central unit 604. In one example, the central unit 604 is configured to support up to twelve (12) RIMs 602(1)-602(12). Each RIM 602(1)-602(M) can be designed to support a particular type of radio source or range of radio sources (i.e., frequencies) to provide flexibility in configuring the central unit 604 and the WDS 600 to support the desired radio sources.

For example, one RIM 602 may be configured to support the Personalized Communications System (PCS) radio band. Another RIM 602 may be configured to support the 800 megahertz (MHz) radio band. In this example, by inclusion of the RIMs 602(1)-602(M), the central unit 604 could be configured to support and distribute communications signals on both PCS and Long-Term Evolution (LTE) 700 radio bands, as an example. The RIMs 602(1)-602(M) may be provided in the central unit 604 that support any frequency bands desired, including but not limited to the US Cellular band, PCS band, Advanced Wireless Service (AWS) band, 700 MHz band, Global System for Mobile communications (GSM) 900, GSM 1800, and Universal Mobile Telecommunications System (UMTS). The RIMs 602(1)-602(M) may also be provided in the central unit 604 that support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 602(1)-602(M) may be provided in the central unit 604 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 6, the downlink digital communications signals 606D(1)-606D(R) are provided to a plurality of optical interfaces provided in the form of optical interface modules (OIMs) 608(1)-608(N) in this embodiment to convert the downlink digital communications signals 606D(1)-606D(R) into downlink optical fiber-based communications signals 610D(1)-610D(R). The notation "1-N" indicates that any number of the referenced component 1-N may be provided. The OIMs 608(1)-608(N) may be configured to provide a plurality of optical interface components (OICs) that contain optical-to-electrical (O/E) and electrical-to-optical (E/O) converters, as will be described in more detail below. The OIMs 608(1)-608(N) support the radio bands that can be provided by the RIMs 602(1)-602(M), including the examples previously described above.

The OIMs 608(1)-608(N) each include E/O converters to convert the downlink digital communications signals 606D(1)-606D(R) into the downlink optical fiber-based communications signals 610D(1)-610D(R). The downlink optical fiber-based communications signals 610D(1)-610D(R) are communicated over a downlink optical fiber-based communications medium 612D to a plurality of remote units 614(1)-614(S). One or more remote units among the remote units 614(1)-614(S) are provided as the remote unit 300 of FIG. 3 configured to reduce power consumption for intermodulation product suppression. The notation "1-S" indicates that any number of the referenced component 1-S may be provided. Remote unit O/E converters provided in the remote units 614(1)-614(S) convert the downlink optical fiber-based communications signals 610D(1)-610D(R) back into the downlink digital communications signals 606D(1)-606D(R), which are provided to antennas 616(1)-616(S) in the remote units 614(1)-614(S) to client devices in the reception range of the antennas 616(1)-616(S).

Remove unit E/O converters are also provided in the remote units 614(1)-614(S) to convert uplink digital communications signals 618U(1)-618U(S) received from the client devices through the antennas 616(1)-616(S) into uplink optical fiber-based communications signals 610U(1)-610U(S). The remote units 614(1)-614(S) communicate the uplink optical fiber-based communications signals 610U(1)-610U(S) over an uplink optical fiber-based communications medium 612U to the OIMs 608(1)-608(N) in the central unit 604. The OIMs 608(1)-608(N) include O/E converters that convert the received uplink optical fiber-based communications signals 610U(1)-610U(S) into uplink digital communications signals 620U(1)-620U(S), which are processed by the RIMs 602(1)-602(M) and provided as the uplink digital communications signals 620U(1)-620U(S). The central unit 604 may provide the uplink digital communications signals 620U(1)-620U(S) to a base station or other communications system.

Note that the downlink optical fiber-based communications medium 612D and the uplink optical fiber-based communications medium 612U connected to each of the remote units 614(1)-614(S) may be a common optical fiber-based communications medium, wherein for example, wave division multiplexing (WDM) is employed to provide the downlink optical fiber-based communications signals 610D(1)-

610D(R) and the uplink optical fiber-based communications signals 610U(1)-610U(S) on the same optical fiber-based communications medium.

Figure 7:
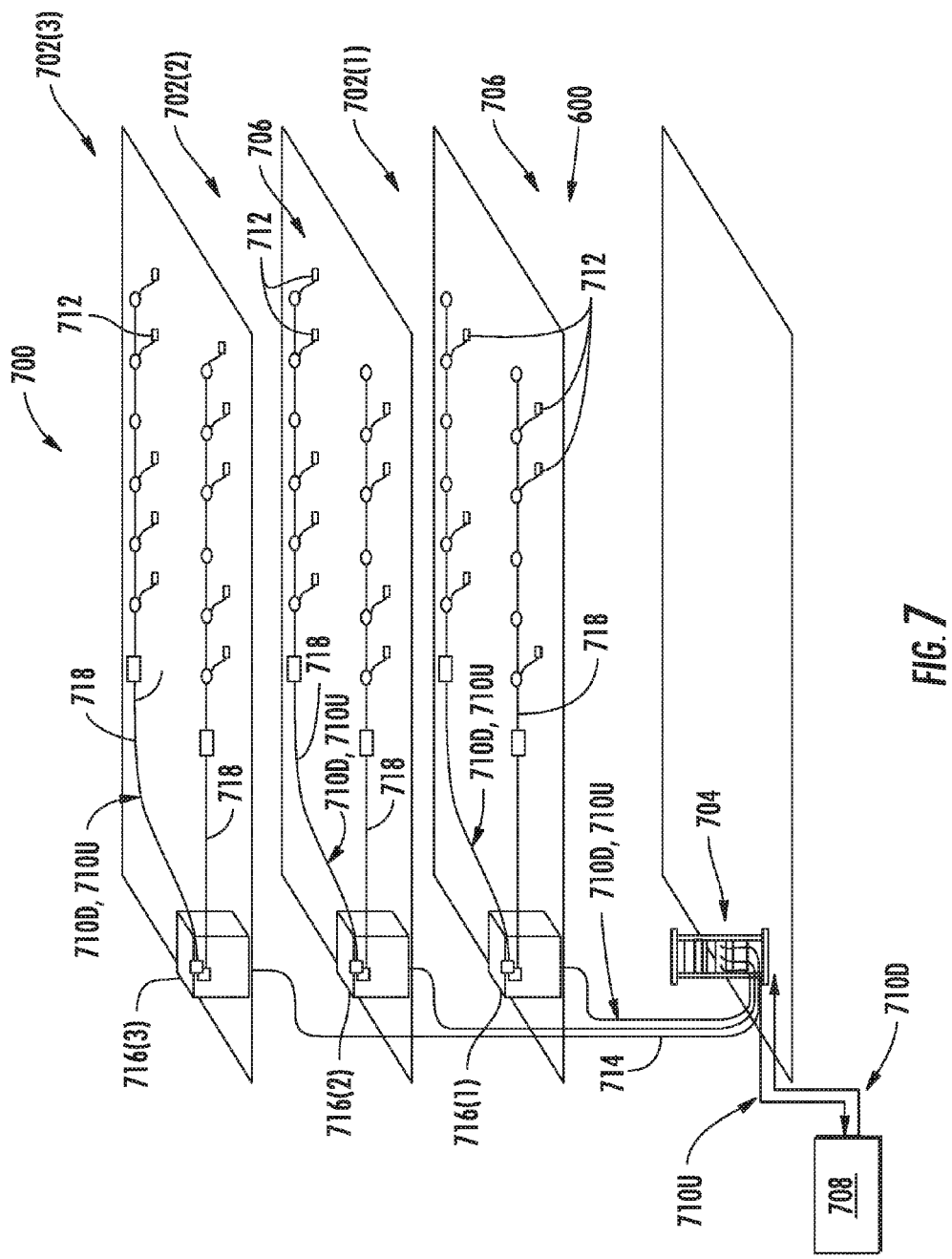
FIG. 7 is a partial schematic cut-away diagram of an exemplary building infrastructure in which a WDS, including the WDS of FIG. 6, can be provided that includes a remote unit, such as the remote unit of FIG. 3, configured to measure the power of a leaked intermodulation product(s) leaked from a downlink signal path into an uplink signal path in the remote unit and selectively enable power amplifiers in a power amplifier circuit based on the measured power of the leaked intermodulation product(s) to suppress the leaked intermodulation product(s) in a reduced power consumption configuration of the remote unit.

The WDS 600 of FIG. 6 may be provided in an indoor environment, as illustrated in FIG. 7. FIG. 7 is a partial schematic cut-away diagram of an exemplary building infrastructure 700 in which a WDS, including the WDS 600 of FIG. 6, including remote units, such as the remote unit 300 of FIG. 3, configured to measure the power of the leaked intermodulation product 302 leaked from the downlink signal path 304 into the uplink signal path 306 in the remote unit 300 and selectively enable power amplifiers 308(1)-308(N) in the power amplifier circuit 310 based on the measured power of the leaked intermodulation product 302 to suppress the leaked intermodulation product 302 in a reduced power consumption configuration of the remote unit 300. The building infrastructure 700 in this embodiment includes a first (ground) floor 702(1), a second floor 702(2), and a third floor 702(3). The floors 702(1)-702(3) are serviced by a central unit 704 to provide antenna coverage areas 706 in the building infrastructure 700. The central unit 704 is communicatively coupled to a base station 708 to receive downlink communications signals 710D from the base station 708. The central unit 704 is communicatively coupled to a plurality of remote units 712 to distribute the downlink communications signals 710D to the remote units 712 and to receive uplink communications signals 710U from the remote units 712, as previously discussed above. The downlink communications signals 710D and the uplink communications signals 710U communicated between the central unit 704 and the remote units 712 are carried over a riser cable 714. The riser cable 714 may be routed through interconnect units (ICUs) 716(1)-716(3) dedicated to each of the floors 702(1)-702(3) that route the downlink communications signals 710D and the uplink communications signals 710U to the remote units 712 and also provide power to the remote units 712 via array cables 718.

Figure 8:
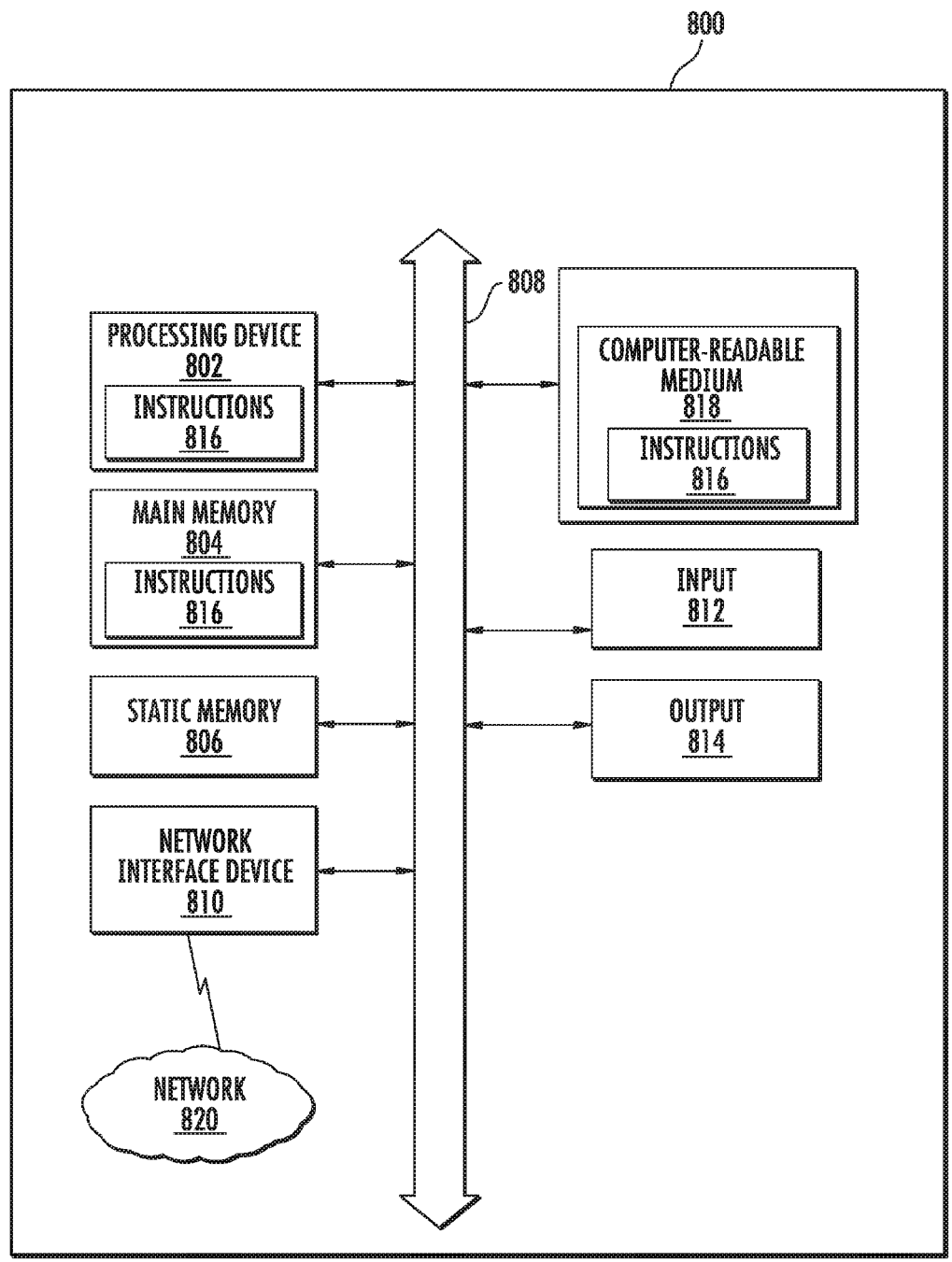
FIG. 8 is a schematic diagram representation of additional detail illustrating an exemplary computer system that could be employed in a controller, including a control circuit in the remote unit of FIG. 3, for reducing power consumption for intermodulation product suppression.

FIG. 8 is a schematic diagram representation of additional detail illustrating an exemplary computer system 800 that could be employed in a controller, including the control circuit 326 in the remote unit 300 of FIG. 3, for reducing power consumption for intermodulation product suppression. In this regard, the computer system 800 is adapted to execute instructions from an exemplary computer-readable medium to perform these and/or any of the functions or processing described herein.

In this regard, the computer system 800 in FIG. 8 may include a set of instructions that may be executed to predict frequency interference to avoid or reduce interference in a multi-frequency DAS. The computer system 800 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 800 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 800 in this embodiment includes a processing device or processor 802, a main memory 804 (e.g., read-only memory (ROM), flash memory, dynamic random access memory (DRAM), such as synchronous DRAM (SDRAM), etc.), and a static memory 806 (e.g., flash memory, static random access memory (SRAM), etc.), which may communicate with each other via a data bus 808. Alternatively, the processor 802 may be connected to the main memory 804 and/or the static memory 806 directly or via some other connectivity means. The processor 802 may be a controller, and the main memory 804 or the static memory 806 may be any type of memory.

The processor 802 represents one or more general-purpose processing devices, such as a microprocessor, central processing unit, or the like. More particularly, the processor 802 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 802 is configured to execute processing logic in instructions for performing the operations and steps discussed herein.

The computer system 800 may further include a network interface device 810. The computer system 800 also may or may not include an input 812, configured to receive input and selections to be communicated to the computer system 800 when executing instructions. The computer system 800 also may or may not include an output 814, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 800 may or may not include a data storage device that includes instructions 816 stored in a computer-readable medium 818. The instructions 816 may also reside, completely or at least partially, within the main memory 804 and/or within the processor 802 during execution thereof by the computer system 800, the main memory 804 and the processor 802 also constituting computer-readable medium. The instructions 816 may further be transmitted or received over a network 820 via the network interface device 810.

While the computer-readable medium 818 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A remote unit in a wireless distribution system (WDS), comprising:
    a power amplifier circuit in a downlink signal path comprising a plurality of power amplifiers, the power amplifier circuit configured to:
        receive a downlink radio frequency (RF) signal in the downlink signal path of the remote unit, the downlink RF signal comprising at least one first downlink RF signal and at least one second downlink RF signal; and
        amplify the downlink RF signal to generate an amplified downlink RF signal comprising at least one amplified first downlink RF signal, at least one amplified second downlink RF signal, and at least one intermodulation product caused by power amplification of the at least one first downlink RF signal and the at least one second downlink RF signal;
    a measurement circuit coupled to an uplink signal path of the remote unit, the measurement circuit configured to measure a power of a leaked intermodulation product caused by the at least one intermodulation product leaked from the downlink signal path into the uplink signal path; and
    a control circuit configured to:
        receive the measured power of the leaked intermodulation product from the measurement circuit;
        determine a selected number of power amplifiers among the plurality of power amplifiers for reducing the measured power of the leaked intermodulation product to a predetermined threshold; and
        control the power amplifier circuit to enable the determined selected number of power amplifiers among the plurality of power amplifiers.

2. The remote unit of claim 1, wherein the control circuit is configured to not enable more than the determined selected number of power amplifiers among the plurality of power amplifiers for reducing the measured power of the leaked intermodulation product to the predetermined threshold.

3. The remote unit of claim 2, wherein the control circuit is further configured to disable power amplifiers among the plurality of power amplifiers that are not among the determined selected number of power amplifiers for reducing the measured power of the leaked intermodulation product to the predetermined threshold.

4. The remote unit of claim 1, wherein the power amplifier circuit comprises a balanced power amplifier circuit comprising at least four power amplifiers configured to be controlled by the control circuit to amplify the downlink RF signal.

5. The remote unit of claim 4, wherein the balanced power amplifier circuit further comprises:
    a first hybrid splitter combiner configured to receive and split the downlink RF signal into an upper downlink RF signal and a lower downlink RF signal;
    a first upper hybrid splitter combiner configured to receive and split the upper downlink RF signal into a first upper downlink RF signal and a second upper downlink RF signal;
    a first power amplifier and a second power amplifier among the at least four power amplifiers configured to amplify the first upper downlink RF signal and the second upper downlink RF signal to generate an amplified first upper downlink RF signal and an amplified second upper downlink RF signal, respectively;
    a second upper hybrid splitter combiner configured to receive and combine the amplified first upper downlink RF signal and the amplified second upper downlink RF signal to generate an amplified upper downlink RF signal;
    a first lower hybrid splitter combiner configured to receive and split the lower downlink RF signal into a first lower downlink RF signal and a second lower downlink RF signal each at approximately one-quarter of a power of the received downlink RF signal;
    a third power amplifier and a fourth power amplifier among the at least four power amplifiers configured to amplify the first lower downlink RF signal and the second lower downlink RF signal to generate an amplified first lower downlink RF signal and an amplified second lower downlink RF signal, respectively;
    a second lower hybrid splitter combiner configured to receive and combine the amplified first lower downlink RF signal and the amplified second lower downlink RF signal to generate an amplified lower downlink RF signal; and
    a second hybrid splitter combiner configured to receive and combine the amplified upper downlink RF signal and the amplified lower downlink RF signal to generate the amplified downlink RF signal.

6. The remote unit of claim 1, wherein the power amplifier circuit is configured to amplify the downlink RF signal to generate the at least one intermodulation product comprising at least one third order intermodulation product caused by power amplification of the at least one first downlink RF signal and the at least one second downlink RF signal.

7. The remote unit of claim 1, further comprising a coupling device configured to couple the downlink signal path and the uplink signal path to an antenna in the remote unit, the coupling device causing the at least one intermodulation product to leak from the downlink signal path into the uplink signal path.

8. The remote unit of claim 7, wherein:
    the power amplifier circuit is configured to receive the downlink RF signal from a signal generator; and
    the coupling device is configured to decouple the antenna from the uplink signal path.

9. The remote unit of claim 7, wherein:
the power amplifier circuit is configured to receive the downlink RF signal from a signal source communicatively coupled to the remote unit;
the coupling device is further configured to provide an uplink RF signal received from client devices via the antenna to the uplink signal path; and
the measurement circuit is configured to measure the power of the leaked intermodulation product between the leaked intermodulation product and the uplink RF signal received from the client devices.

10. The remote unit of claim 1, wherein the measurement circuit is provided in the control circuit.

11. A method for suppressing a leaked intermodulation product in an uplink signal path in a remote unit in a wireless distribution system (WDS), comprising:
measuring a power of a leaked intermodulation product caused by at least one intermodulation product leaked from a downlink signal path into an uplink signal path;
determining a selected number of power amplifiers among a plurality of power amplifiers in a power amplifier circuit in the remote unit for reducing the measured power of the leaked intermodulation product to a predetermined threshold; and
controlling the power amplifier circuit to enable the determined selected number of power amplifiers among the plurality of power amplifiers.

12. The method of claim 11, further comprising not enabling more than the determined selected number of power amplifiers among the plurality of power amplifiers for reducing the measured power of the leaked intermodulation product to the predetermined threshold.

13. The method of claim 12, further comprising disabling power amplifiers among the plurality of power amplifiers that are not among the determined selected number of power amplifiers for reducing the measured power of the leaked intermodulation product to the predetermined threshold.

14. The method of claim 11, further comprising providing a balanced power amplifier circuit as the power amplifier circuit, wherein the balanced power amplifier circuit comprises at least four power amplifiers configured to be controlled by a control circuit to amplify a downlink RF signal.

15. The method of claim 11, further comprising coupling the downlink signal path and the uplink signal path to an antenna in the remote unit.

16. The method of claim 15, further comprising:
receiving a downlink RF signal from a signal generator; and
decoupling the antenna from the uplink signal path.

17. The method of claim 15, further comprising:
receiving a downlink RF signal from a signal source communicatively coupled to the remote unit;
providing an uplink RF signal received from client devices via the antenna to the uplink signal path; and
measuring the power of the leaked intermodulation product between the leaked intermodulation product and the uplink RF signal received from the client devices.

18. A wireless distribution system (WDS), comprising:
a central unit; and
a plurality of remote units configured to:
receive a plurality of downlink communications signals from the central unit; and
provide a plurality of uplink communications signals to the central unit;
wherein one or more remote units among the plurality of remote units each comprises:
a power amplifier circuit in a downlink signal path comprising a plurality of power amplifiers, the power amplifier circuit configured to:
receive a downlink radio frequency (RF) signal in the downlink signal path of the remote unit, the downlink RF signal comprising at least one first downlink RF signal and at least one second downlink RF signal; and
amplify the downlink RF signal to generate an amplified downlink RF signal comprising at least one amplified first downlink RF signal, at least one amplified second downlink RF signal, and at least one intermodulation product caused by power amplification of the at least one first downlink RF signal and the at least one second downlink RF signal;
a measurement circuit coupled to an uplink signal path of the remote unit, the measurement circuit configured to measure a power of a leaked intermodulation product caused by the at least one intermodulation product leaked from the downlink signal path into the uplink signal path; and
a control circuit configured to:
receive the measured power of the leaked intermodulation product from the measurement circuit;
determine a selected number of power amplifiers among the plurality of power amplifiers for reducing the measured power of the leaked intermodulation product to a predetermined threshold; and
control the power amplifier circuit to enable the determined selected number of power amplifiers among the plurality of power amplifiers.

19. The WDS of claim 18, wherein the control circuit is configured to not enable more than the determined selected number of power amplifiers among the plurality of power amplifiers for reducing the measured power of the leaked intermodulation product to the predetermined threshold.

20. The WDS of claim 19, wherein the control circuit is further configured to disable power amplifiers among the plurality of power amplifiers that are not among the determined selected number of power amplifiers for reducing the measured power of the leaked intermodulation product to the predetermined threshold.

21. The WDS of claim 18, wherein the power amplifier circuit comprises a balanced power amplifier circuit comprising at least four power amplifiers configured to be controlled by the control circuit to amplify the downlink RF signal.

22. The WDS of claim 21, wherein the balanced power amplifier circuit further comprises:
a first hybrid splitter combiner configured to receive and split the downlink RF signal into an upper downlink RF signal and a lower downlink RF signal;
a first upper hybrid splitter combiner configured to receive and split the upper downlink RF signal into a first upper downlink RF signal and a second upper downlink RF signal;
a first power amplifier and a second power amplifier among the at least four power amplifiers configured to amplify the first upper downlink RF signal and the second upper downlink RF signal to generate an amplified first upper downlink RF signal and an amplified second upper downlink RF signal, respectively;
a second upper hybrid splitter combiner configured to receive and combine the amplified first upper downlink RF signal and the amplified second upper downlink RF signal to generate an amplified upper downlink RF signal;
a first lower hybrid splitter combiner configured to receive and split the lower downlink RF signal into a first lower downlink RF signal and a second lower downlink RF signal each at approximately one-quarter of a power of the received downlink RF signal;
a third power amplifier and a fourth power amplifier among the at least four power amplifiers configured to amplify the first lower downlink RF signal and the second lower downlink RF signal to generate an amplified first lower downlink RF signal and an amplified second lower downlink RF signal, respectively;
a second lower hybrid splitter combiner configured to receive and combine the amplified first lower downlink RF signal and the amplified second lower downlink RF signal to generate an amplified lower downlink RF signal; and
a second hybrid splitter combiner configured to receive and combine the amplified upper downlink RF signal and the amplified lower downlink RF signal to generate the amplified downlink RF signal.

23. The WDS of claim 18, wherein the power amplifier circuit is configured to amplify the downlink RF signal to generate the at least one intermodulation product comprising at least one third order intermodulation product caused by power amplification of the at least one first downlink RF signal and the at least one second downlink RF signal.

24. The WDS of claim 18, wherein each of the one or more remote units further comprises a coupling device configured to couple the downlink signal path and the uplink signal path to an antenna in the remote unit, the coupling device causing the at least one intermodulation product to leak from the downlink signal path into the uplink signal path.

25. The WDS of claim 24, wherein:
the power amplifier circuit is configured to receive the downlink RF signal from a signal generator; and
the coupling device is configured to decouple the antenna from the uplink signal path.

26. The WDS of claim 24, wherein:
the power amplifier circuit is configured to receive the downlink RF signal from a signal source communicatively coupled to the remote unit;
the coupling device is further configured to provide an uplink RF signal received from client devices via the antenna to the uplink signal path; and
the measurement circuit is configured to measure the power of the leaked intermodulation product between the leaked intermodulation product and the uplink RF signal received from the client devices.

27. The WDS of claim 18, wherein the measurement circuit is provided in the control circuit.

28. The WDS of claim 18, wherein:
the central unit comprises:
an electrical-to-optical (E/O) converter configured to convert the plurality of downlink communications signals into a plurality of downlink optical fiber-based communications signals, respectively; and
an optical-to-electrical (O/E) converter configured to convert a plurality of uplink optical fiber-based communications signals into the plurality of uplink communications signals, respectively; and
the plurality of remote units comprises:
a plurality of remote unit O/E converters configured to convert the plurality of downlink optical fiber-based communications signals into the plurality of downlink communications signals, respectively; and
a plurality of remote unit E/O converters configured to convert the plurality of uplink communications signals into the plurality of uplink optical fiber-based communications signals, respectively.

* * * * *